(12) United States Patent
Hanaoka et al.

(10) Patent No.: US 10,987,838 B2
(45) Date of Patent: Apr. 27, 2021

(54) INJECTION MOLD, INJECTION MOLDING METHOD, AND MOLDED ARTICLE

(71) Applicant: HONDA MOTOR CO., LTD., Tokyo (JP)

(72) Inventors: Atsushi Hanaoka, Tochigi (JP); Atsushi Yusa, Tochigi (JP); Takahiro Watanabe, Tochigi (JP); Kentaro Sakai, Tochigi (JP); Kazuhiro Kawano, Tochigi (JP); Hajime Miyamoto, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 129 days.

(21) Appl. No.: 16/082,058

(22) PCT Filed: Mar. 1, 2017

(86) PCT No.: PCT/JP2017/008138
§ 371 (c)(1),
(2) Date: Sep. 4, 2018

(87) PCT Pub. No.: WO2017/169490
PCT Pub. Date: Oct. 5, 2017

(65) Prior Publication Data
US 2019/0255750 A1    Aug. 22, 2019

(30) Foreign Application Priority Data

Mar. 31, 2016  (JP) .............................. JP2016-072108

(51) Int. Cl.
*B29C 45/26* (2006.01)
*B29C 45/16* (2006.01)
(Continued)

(52) U.S. Cl.
CPC .......... *B29C 45/1639* (2013.01); *B29C 45/16* (2013.01); *B29C 45/26* (2013.01); *B29C 45/56* (2013.01); *B29L 2031/3008* (2013.01)

(58) Field of Classification Search
CPC ................................................. B29C 45/1639
See application file for complete search history.

(56) References Cited

U.S. PATENT DOCUMENTS 5,372,491 A * 12/1994 Fritsch ................ B29C 45/1639
264/314
2003/0218272 A1* 11/2003 Sekito ................. B29C 45/1639
264/255
(Continued)

FOREIGN PATENT DOCUMENTS

DE         4224171 A1 * 1/1994 ......... B29C 45/1639
EP         2070680 A1 * 6/2009 ......... B29C 45/1639
(Continued)

OTHER PUBLICATIONS

International Search Report, dated Apr. 4, 2017 (Apr. 4, 2017), 2 pages.

*Primary Examiner* — Ryan M Ochylski
(74) *Attorney, Agent, or Firm* — Rankin, Hill & Clark LLP (57) ABSTRACT

Provided are an injection mold and an injection molding method by which a boundary line between a first material and a second material curved so as to be sharply bent like a round chamfered shape can be formed reliably in a desired position, and a molded article molded using the injection mold and the injection molding method. The sum of a length w of an inclined-part forming part 51a and a length y of a thinned-part forming part 51b in a width direction of a linear part or a width direction of a curved part is at least equal to a prescribed value, and the thinned-part forming part 51b (Continued)

forming the curved part has a second length y longer than a first length in the width direction of the curved part.

1 Claim, 7 Drawing Sheets (51) Int. Cl.
*B29C 45/56* (2006.01)
*B29L 31/30* (2006.01)

(56) References Cited

U.S. PATENT DOCUMENTS

| 2010/0187722 | A1* | 7/2010 | Fiammengo | ........ B29C 45/1639 |
| | | | | 264/255 |
| 2012/0282424 | A1 | 11/2012 | Tabeya et al. | |

FOREIGN PATENT DOCUMENTS

| JP | 01-247124 | | 10/1989 | | |
| JP | 06190865 | A * | 7/1994 | ......... | B29C 45/1639 |
| JP | 06297504 | A * | 10/1994 | ......... | B29C 45/1639 |
| JP | 10-095029 | | 4/1998 | | |
| JP | 10250519 | A * | 9/1998 | ......... | B29C 45/1639 |
| JP | 2009-226889 | | 10/2009 | | |
| JP | 2009-241463 | | 10/2009 | | |
| JP | 2015-009449 | | 1/2015 | | |
| JP | 2015-182384 | | 10/2015 | | |
| JP | 2017-013259 | | 1/2017 | | |
| WO | 2011/086959 | | 7/2011 | | |

* cited by examiner

ND MOLDED ARTICLE

INJECTION MOLD, INJECTION MOLDING METHOD, AND MOLDED ARTICLE

TECHNICAL FIELD

The present invention relates to an injection mold, an injection molding method, and a molded article. More particularly, the present invention relates to an injection mold and an injection molding method for integrally molding a first material and a second material each having a different composition, and a molded article.

BACKGROUND ART

Conventionally, from viewpoint of a design, in an instrument panel of a vehicle, an upper surface portion and a lower surface portion are sometimes molded with materials of different colors. Further, the instrument panel sometimes attempts to reduce the material cost by forming an upper surface portion easily exposed to direct sunlight with a material excellent in heat resistance and molding a lower surface portion that is hard to be exposed to direct sunlight with a relatively inexpensive material. In such an instrument panel, for example, the upper surface portion and the lower surface portion are molded separately, or a part thereof is painted after molding. In this case, in the manufacturing of the instrument panel, a process of joining separately formed components or a painting process is required, resulting in an increase in manufacturing cost. In view of this, there is known a method of injecting a resin having a different composition into a single cavity as a two-piece molding to obtain a single molded article (see, for example, Patent Document 1). In the technique disclosed in Patent Document 1, after the processes of injection and pressure holding of the first material are completed and the cooling process is started, a nest of a boundary portion (a joining part) between the first material and the second material is moved (core back), and the second material is injected.

Patent Document 1: Japanese Unexamined Patent Application, Publication No. 2015-182384

DISCLOSURE OF THE INVENTION

Problems to be Solved by the Invention

A boundary line between the first material and the second material has a linearly extending portion, and a curved portion that connects the linearly extending portion and the linearly extending portion. The boundary line between the first material and the second material may be formed at an unintended position, in the curved portion, particularly in a portion curved to sharply bend like a round chamfered shape.

The present invention has been made to solve the above problems, and an object of the present invention is to provide an injection mold and an injection molding method capable of reliably forming the boundary line between the first material and the second material that is curved so as to be sharply bent like a round chamfered shape at a desired position, and a molded article molded by the injection mold and the injection molding method.

Means for Solving the Problems (1) An injection mold (for example, an injection mold 1 to be described later) provided with a partition member (for example, a movable core mold 5 to be described later) that forms a first cavity part (for example, a first cavity part 6a to be described later) configured to mold a first material (for example, a first material m1 to be described later) and forms a second cavity part (for example, a second cavity part 6b to be described later) configured to mold a second material (for example, a second material m2 to be described later) by moving after formation of the first material, wherein a portion of the first cavity part that is formed by the partition member and molds a joining part (for example, a joining part 112 to be described later) of the first material joined to the second material includes an inclined-part forming part (for example, an inclined surface 51a to be described later) that molds a first material inclined part (for example, an inclined part 112a to be described later) inclined so that a thickness of the joining part becomes thinner toward an end edge of the first material in the joining part, and a thinned-part forming part (for example, a flat surface 51b to be described later) that is continuously connected to the inclined-part forming part and forms a first material thinned part (for example, a thinned part 112b to be described later) of a predetermined thickness in a part of the joining part, the joining part has a linear part having a linear shape, and a curved part having a curved shape, a sum of a length (for example, lengths v, w to be described later) of the inclined-part forming part and a length (for example, lengths x, y to be described later) of the thinned-part forming part in a width direction of the linear part and a width direction of the curved part is at least equal to a prescribed value, a thickness (for example, a thickness L11 to be described later) of the thinned-part forming part that molds the linear part is substantially the same as a thickness (for example, a thickness L12 to be described later) of the thinned-part forming part that molds the curved part, the thinned-part forming part (for example, a flat surface 51b to be described later) that molds the linear part has a first length (for example, a first length x to be described later) in the width direction of the linear part, and the thinned-part forming part (for example, a flat surface 51b to be described later) that molds the curved part has a second length (for example, a second length y to be described later) longer than the first length in the width direction of the curved part.

(2) An injection molding method of integrally molding a first material (for example, a first material m1 to be described later) and a second material (for example, a second material m2 to be described later), by injecting the first material and the second material having different compositions into a mold and bringing the first and second materials into contact with each other, the method including: a first material molding process of molding a first material inclined part (for example, an inclined part 112a to be described later) that is inclined so that a plate thickness of a joining part becomes thinner toward an end edge of the first material in the joining part, and a first material thinned part (for example, a thinned part 112b to be described later) that is continuously connected to the first material inclined part and has a predetermined thickness, in a portion of a first cavity part (for example, a first cavity part 6a to be described later) that molds the joining part (for example, a joining part 112 to be described later) of the first material joined to the second material; and a second material joining process of molding the second material and joining the second material to the joining part of the first material, in a second cavity part (for example, a second cavity part 6b to be described later) that molds the second material joined to the first material, wherein in the first material molding process, the first material is molded so that the joining part has a linear part having a linear shape and a curved part having a curved shape, a sum of a length (for example, a length V, W to be described later) of the first material inclined part and a length (for example, a length X, Y to be described later) of the first material thinned part in a width direction of the linear part and in a width direction of the curved part is set at least equal to a prescribed value, a thickness (for example, a thickness L111 to be described later) of the first material thinned part of the linear part and a thickness (for example, a thickness L112 to be described later) of the first material thinned part of the curved part are substantially the same, and the first material is molded so that, when a length of the first material thinned part of the linear part in the width direction of the linear part is set as a first length (for example, a first length X to be described later), the length of the first material thinned part of the curved part in the width direction of the curved part is set to a second length (for example, a second length Y to be described later) longer than the first length.

(3) A molded article (for example, an instrument panel 100 to be described later) in which a first material (for example, a first material m1 to be described later) and a second material (for example, a second material m2 to be described later) having compositions different from each other are injected into a mold and come into contact with each other to integrally mold the first material and the second material, wherein a joining part (for example, a joining part 112 to be described later) of the first material joined to the second material has a first material inclined part (for example, an inclined part 112a to be described later) that is inclined so that a plate thickness of the joining part becomes thinner toward an end edge of the first material at the joining part, and a first material thinned part (for example, a thinned part 112b to be described later) that is continuously connected to the first material inclined part and has a predetermined thickness, the joining part has a linear part having a linear shape, and a curved part having a curved shape, a sum of a length (for example, a length V, W to be described later) of the first material inclined part and a length (for example, a length X, Y to be described later) of the first material thinned part in a width direction of the linear part and a width direction of the curved part is at least equal to a prescribed value, a thickness of the first material thinned part of the linear part is substantially the same as a thickness of the first material thinned part of the curved part, and when the length of the first material thinned part of the linear part in the width direction of the linear part is set as a first length (for example, a first length X to be described later), the first material thinned part of the curved part in the width direction of the curved part has a second length (for example, a second length Y to be described later) longer than the first length.

According to the inventions (1) to (3), the thickness of the thinned part in the curved part can be set to be thinner than the thickness of the inclined part in the linear part. Therefore, when the thinned part of the curved part of the joining part is cooled, since the thinned part is thin and wide at the joining part of the curved part, the mold contact area per volume at the joining part of the curved part can be inhibited from being smaller than the mold contact area per volume at the joining part of the linear part. As a result, it is possible to accelerate the cooling in the thinned part in the curved part, suppress the volume shrinkage to be low, and suppress an occurrence of so-called sinking. As a result, it is possible to avoid defective appearance due to entry of the second material into the portion in which the sinking is formed. Therefore, it is possible to prevent the boundary line between the first material and the second material from being formed at an unintended position in the curved part.

Effects of the Invention

According to the present invention, it is possible to provide an injection mold and an injection molding method capable of reliably forming the boundary line between the first material and the second material that is curved so as to be sharply bent like a round chamfered shape at a desired position, and a molded article molded by the injection mold and the injection molding method.

PREFERRED MODE FOR CARRYING OUT THE INVENTION

Hereinafter, embodiments of the present invention will be described in detail with reference to the drawings.

Figure 1:
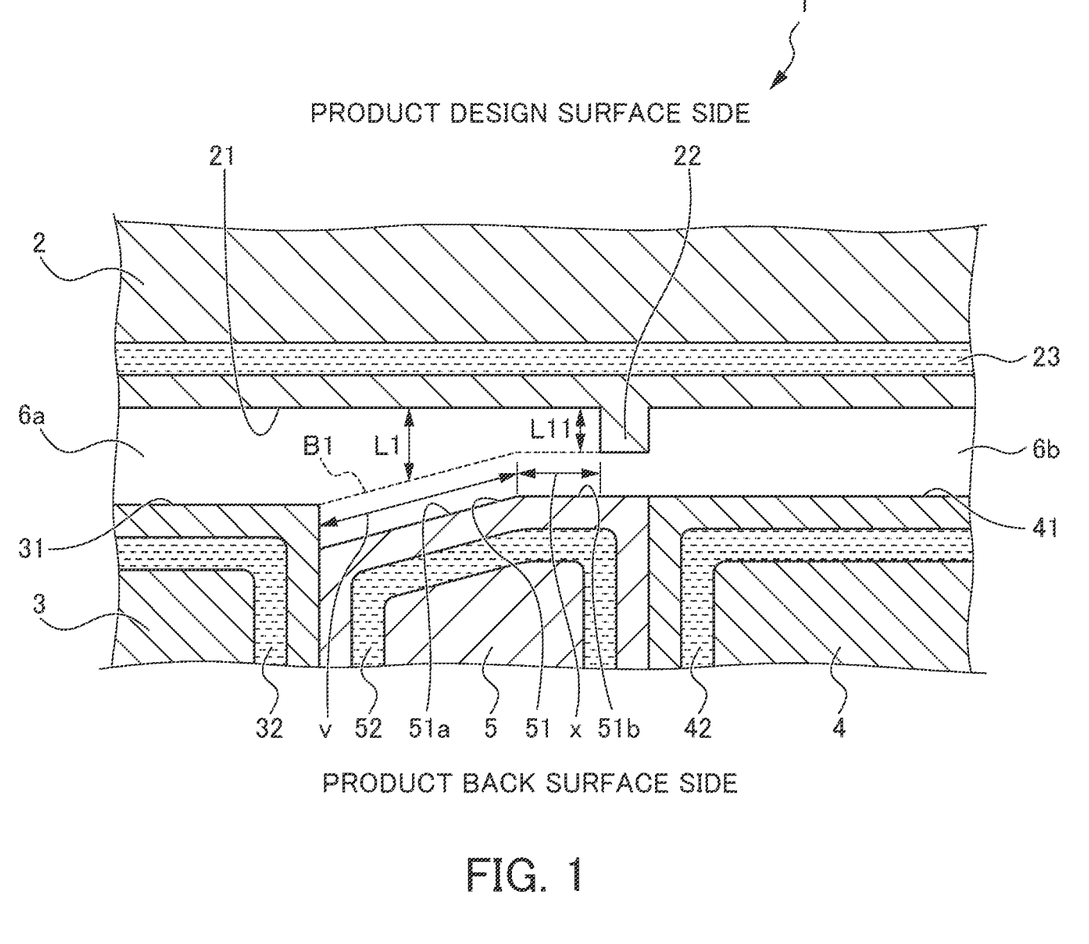
FIG. 1 is a cross-sectional view illustrating a portion of an injection mold according to an embodiment of the present invention, that molds a linear part of a joining part of a first material.
Figure 2:
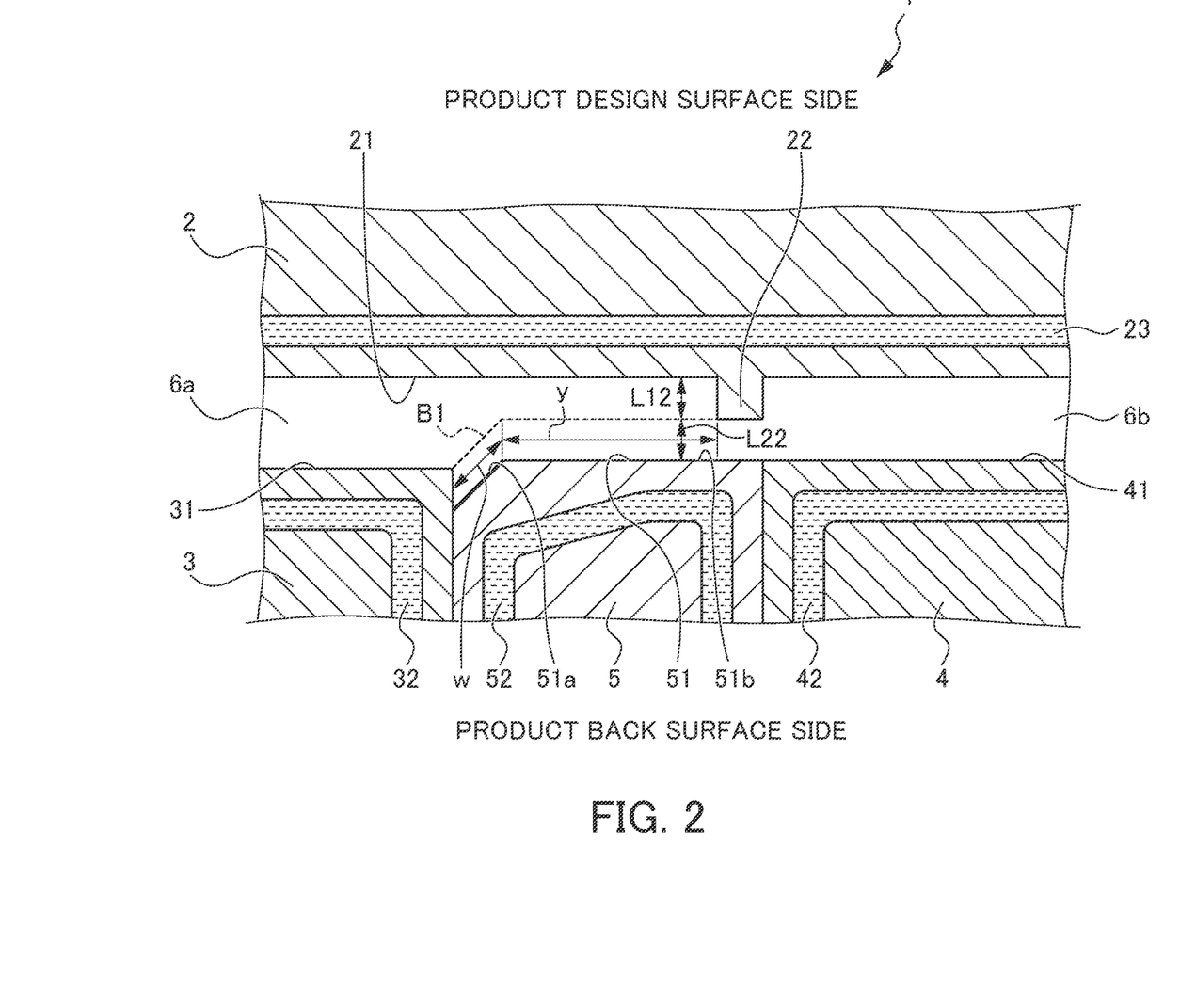
FIG. 2 is a cross-sectional view illustrating a portion of an injection mold according to the embodiment of the present invention, that molds a curved part of the joining part of the first material.
Figure 3:
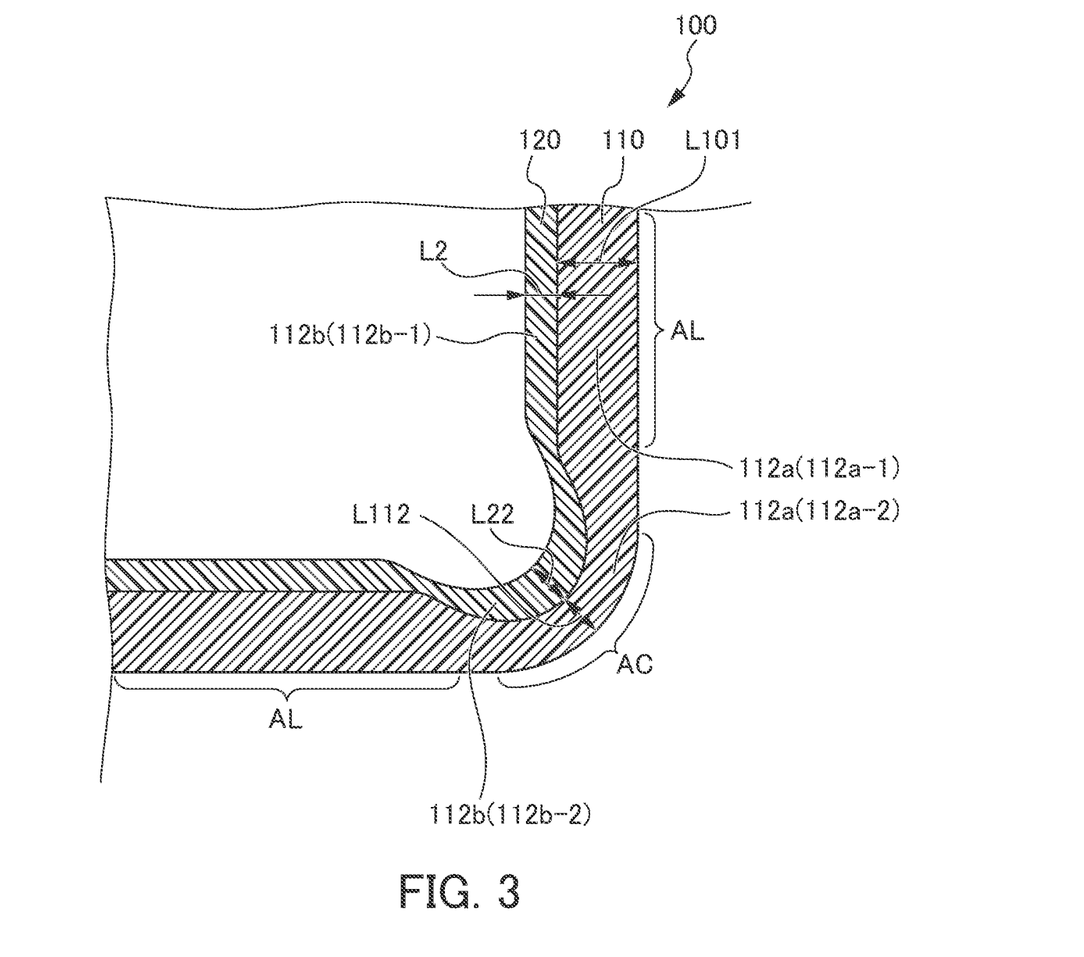
FIG. 3 is a cross-sectional view illustrating a first molded part and a second molded part of an instrument panel as a molded article according to the embodiment of the present invention.

First, an injection mold 1 will be described. FIG. 1 is a cross-sectional view illustrating a portion of the injection mold 1 according to an embodiment of the present invention, that molds a linear part of a joining part 112 of a first material m1. FIG. 2 is a cross-sectional view illustrating a portion of an injection mold 1 according to the embodiment of the present invention, that molds a curved part of the joining part 112 of the first material m1. FIG. 3 is a cross-sectional view illustrating a first molded part 110 and a second molded part 120 of an instrument panel 100 as a molded article according to the embodiment of the present invention, illustrates a cross-sectional view taken along the line A-A in FIG. 4 in a portion indicated by a line AL in FIG. 3, and illustrates a cross-sectional view taken along the line B-B in FIG. 5 in a portion indicated by a line AC in FIG. 3. As illustrated in FIG. 1, the injection mold 1 molds an instrument panel 100 of a vehicle as an example of a resin molded article. The injection mold 1 integrally molds a first material m1 and the second material m2 by injecting the first material m1 and the second material m2 having different compositions into the mold 1 and bringing them into contact with each other. The injection mold 1 includes an upper mold 2, a first lower mold 3, a second lower mold 4, and a movable core mold 5.

The upper mold 2 is a fixed mold, and has a lower surface 21. On the lower surface 21 of the upper mold 2, a protruding part 22 is provided vertically above a boundary line between the movable core mold 5 and the second lower mold 4. The protruding part 22 has a certain height and width, and extends along the end region on the movable core mold 5 side. The upper mold 2 is provided with a cooling water passage 23 through which the cooling water circulates inside the upper mold 2. By providing a cooling water passage 23 inside the upper mold 2, the lower surface 21 of the upper mold 2 is made of a member having a higher cooling effect than other portions.

The first lower mold 3 is a movable mold that opens to face the upper mold 2 and has an upper surface 31 that is parallel to the lower surface 21 of the upper mold 2. The first lower mold 3 is adjacent to the movable core mold 5. The first lower mold 3 is provided with a cooling water passage 32 through which the cooling water circulates inside the first lower mold 3. By providing a cooling water passage 32 inside the first lower mold 3, the upper surface 31 of the first lower mold 3 is made of a member having a higher cooling effect than other portions.

The second lower mold 4 is a movable mold that opens to face the upper mold 2 and has an upper surface 41 that is parallel to the lower surface 21 of the upper mold 2. The second lower mold 4 is adjacent to the movable core mold 5 on the side opposite to the first lower mold 3. The second lower mold 4 is provided with a cooling water passage 42 through which the cooling water circulates inside the second lower mold 4. By providing a cooling water passage 42 inside the second lower mold 4, the upper surface 41 of the second lower mold 4 is made of a member having a higher cooling effect than other portions.

The movable core mold 5 serving as a partition member is disposed between the first lower mold 3 and the second lower mold 4 to be separately independently movable up and down. The movable core mold 5 has an upper surface 51 that can be brought into contact with the protruding part 22 of the upper mold 2. The upper surface 51 of the movable core mold 5 has an inclined surface 51a as an inclined-part forming part in which the position of the upper surface 51 increases toward the protruding part 22 of the upper mold 2, and a flat surface 51b as a thinned-part forming part that is flatly continuous from the highest position of the inclined surface 51a to come into contact with the protruding part 22 of the upper mold 2. The movable core mold 5 may be made of a material having high thermal conductivity such as BeCu. The movable core mold 5 is provided with a cooling water passage 52 through which the cooling water circulates inside the movable core mold 5. The movable core mold 5 is made of a member having high thermal conductivity such as BeCu, and the upper surface 51 of the movable core mold 5 is made of a member having high thermal conductivity and high cooling effect as compared with other portions or other molds, by providing a cooling water passage 52 inside the movable core mold 5.

The movable core mold 5 constitutes a first cavity part 6a for molding the first material m1, and forms a second cavity part 6b that molds the second material m2 by moving after molding of the first material m1.

The first cavity part 6a is formed between the upper mold 2, the first lower mold 3 and the movable core mold 5. In the first cavity part 6a, a contact part between the protruding part 22 of the upper mold 2 and the flat surface 51b of the upper surface 51 of the movable core mold 5 that has moved upward is defined as a downstream side end of the first material m1 flowing in from the a left side of the drawings, and the first material m1 is injected from the upstream side between the upper mold 2 and the first lower mold 3.

The first cavity part 6a molds the first molded part 110 of the instrument panel 100 including a thick plate part 111 and a joining part 112 by the first material m1. The first cavity part 6a molds a product design surface A side of the instrument panel 100 on the upper mold 2 side. The first cavity part 6a molds a product back surface B side of the instrument panel 100 on the side of the first lower mold 3 and the movable core mold 5. The first cavity part 6a molds the thick plate part 111 of the first molded part 110 between the upper mold 2 and the first lower mold 3 at a constant plate thickness. The first cavity part 6a molds the joining part 112 joined to the second material m2 in the first material m1 between the upper mold 2 and the movable core mold 5 to have a plate thickness thinner than that of the thick plate part 111 of the upstream side continuous with the joining part 112.

The first cavity part 6a molds an inclined part 112a and a thinned part 112b of the linear part and the curved part of the first molded part 110 between the upper mold 2 and the movable core mold 5 for forming the joining part 112.

Figure 4:
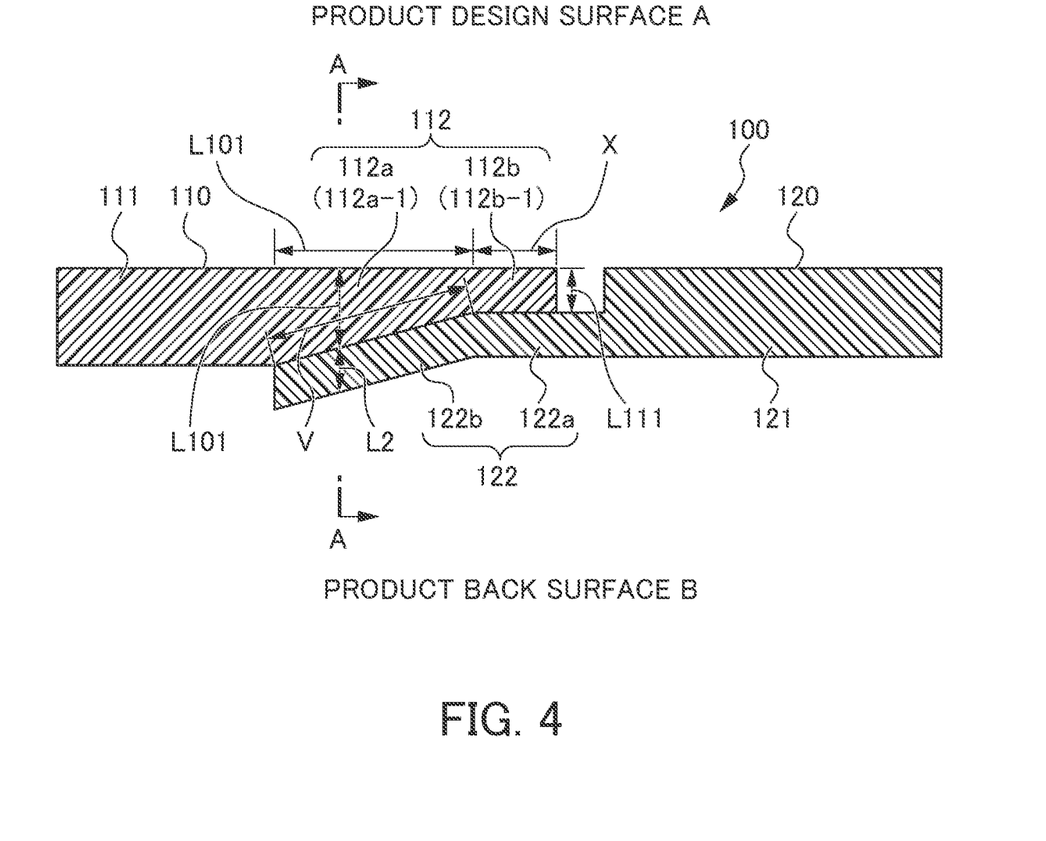
FIG. 4 is a cross-sectional view illustrating a portion of an instrument panel as a molded article according to the embodiment of the present invention, and a portion of the linear part of the first material.

Since the upper surface 51 of the movable core mold 5 is formed on the inclined surface 51a, the first cavity part 6a makes the inclined part 112a of the first molded part 110 have a plate thickness thinner than that of the thick plate part 111 on the upstream side continuous with the joining part 112 joined to the second material m2 in the first material m1 toward the end edge of the joining part 112 (toward a right end edge of the joining part 112 illustrated in FIG. 4). In a region of the first cavity part 6a for forming the inclined part 112a, by raising the position of the upper surface 51 of the movable core mold 5 as the inclined surface 51a, which is the upper surface 51 of the movable core mold 5, is directed toward the downstream side end, the thickness of the joining part 112 joined to the second material m2 in the first material m1 gradually changes to become thinner toward the downstream side end. A region that forms the inclined part 112a of the first cavity part 6a is configured so that a difference in volume shrinkage caused by cooling and solidification of the joining part 112 gradually changes to decrease toward the downstream side end together with the plate thickness changes.

Since the upper surface 51 of the movable core mold 5 is formed on the flat surface 51b, the first cavity part 6a makes the thinned part 112b of the first molded part 110 have a plate thickness thinner than that of the thick plate part 111 on the upstream side continuous with the joining part 112 joined to the second material m2 in the first material m1. Since the flat surface 51b, which is the upper surface 51 of the movable core mold 5, has the position of the upper surface 51 of the movable core mold 5 constant from the highest position of the inclined surface 51a, in the region of the first cavity part 6a that forms the thinned part 112b, a state in which the thickness of the joining part 112 joined to the second material m2 in the first material m1 is thinned by a predetermined thickness continues.

As illustrated in FIG. 1, a sum of a length v of the inclined surface 51a as the inclined-part forming part in the width direction of the linear part and in the width direction of the curved part, and a length x of the flat surface 51b in the same direction is at least equal to a prescribed value. Similarly, as illustrated in FIG. 2, a sum of a length w of the inclined surface 51a as the inclined-part forming part in the width direction of the linear part and in the width direction of the curved part, and a length y of the flat surface 51b in the same direction is at least equal to a prescribed value. Further, a thickness L11 (see FIG. 1) of the portion of the first cavity part 6a in the portion of the flat surface 51b molding the thinned part 112b-1 in the linear part is substantially the same as a thickness L12 (see FIG. 2) of the portion of the first cavity part 6a of the portion of the flat surface 51b molding the thinned part 112b-2 in the curved part. Here, "substantially the same" means that it may not completely identical, and it includes, for example, a case where it is intended to be identical, but as a result, an error is occurred.

The boundary line between the first material m1 and the second material m2 on the product design surface side of the instrument panel 100 as a molded article is formed at the position of the instrument panel 100 corresponding to a position of a line B1, and the instrument panel 100 has a portion extending linearly as viewed from the product design side (a portion of the instrument panel 100 molded at the position of the line AL in FIG. 3), and a curved portion that connects the linearly extending portion and the linearly extending portion (a portion of the instrument panel 100 that is a portion extending in a curved shape and molded at the position of the curve AC). The portion of the first cavity part 6a of the portion of the flat surface 51b that molds the thinned part 112b-1 of the linear part, which is a portion of the edge part of the joining part 112 of the first material m1 having a linear shape, has a first length x in the width direction of the linear part as illustrated in FIG. 1. Further, as illustrated in FIG. 2, the flat surface 51b molding the curved part that is the portion of the edge part of the curved joining part 112 has a second length y that is longer than the first length x in the width direction of the curved part. That is, as illustrated in FIG. 3, in the portion of the injection mold 1 for molding the curved portion in which the joining part 112 is bent to be sharply bent like the round chamfered shape, since the thickness L112 of the thinned part 112b of the first molded part 110 is thin, the inclined surface 51a is shorter in the left-right direction in FIG. 2. Further, as illustrated in FIG. 3, in the portion of the injection mold 1 molding the linearly extending portion of the joining part 112, in order to make the inclined part 112a of the first molded part 110 appear in the cross section, the inclined surface 51a is long in the left-right direction in FIG. 1.

The second cavity part 6b is formed between the upper mold 2, the second lower mold 4 and the movable core mold 5. In the second cavity part 6b, a space between the joining part 112 of the first material m1 and the upper surface 51 of the movable core mold 5 that has moved (core-backed) downward by a predetermined distance is defined as a downstream side end of the second material m2 flowing in from a right side of the drawings, and the second material m2 is injected from the upstream side between the upper mold 2 and the second lower mold 4. That is, an injection direction of the second material m2 is opposite to the direction of the first material m1.

The second cavity part 6b molds the second molded part 120 of the instrument panel 100 including a thick plate part 121 and a joining part 122 by the second material m2. The second cavity part 6b molds the product design surface A side of the instrument panel 100 on the upper mold 2 side. The second cavity part 6b molds the product back surface B side of the instrument panel 100 on the side of the second lower mold 4 and the movable core mold 5. The second cavity part 6b forms the thick plate part 121 of the second molded part 120 between the upper mold 2 and the second lower mold 4 at a constant plate thickness. The second cavity part 6b molds the joining part 122 joined to the first material m1 in the second material m2 between the joining part 112 of the first material m1 continuous with the protruding part 22 and the protruding part 22 of the lower surface 21 of the upper mold 2 and the movable core mold 5 to have a plate thickness thinner than that of the thick plate part 121 on the upstream side continuous with the joining part 122.

The second cavity part 6b molds a thinned part 122a and an inclined distal end part 122b of the second molded part 120 between the joining part 112 of the first material m1 for forming the joining part 122 and the movable core mold 5.

Since the upper surface 51 of the movable core mold 5 is formed on the flat surface 51b, the second cavity part 6b makes the thinned part 122a of the second molded part 120 have a plate thickness thinner than that of the thick plate part 121 on the upstream side continuous with the joining part 122 joined to the first material m1 in the second material m2. Since the flat surface 51b, which is the upper surface 51 of the movable core mold 5, has the position of the upper surface 51 of the movable core mold 5 constant from the highest position of the inclined surface 51a, in the region for forming the thinned part 122a of the second cavity part 6b, a state in which the thickness of the joining part 122 joined to the first material m1 in the second material m2 is constant is continued.

Since the upper surface 51 of the movable core mold 5 is formed on the inclined surface 51a, the second cavity part 6b makes the inclined distal end part 122b of the second molded part 120 have a plate thickness thinner than that of the thick plate part 121 on the upstream side continuous with the joining part 122 joined to the first material m1 in the second material m2. By lowering the position of the upper surface 51 of the movable core mold 5 as the inclined surface 51a, which is the upper surface 51 of the movable core mold 5, goes toward the downstream side end, the region for forming the inclined distal end part 122b of the second cavity part 6b changes so that the joining part 122 joined to the first material m1 in the second material m2 becomes a downwardly inclined distal end. Since the region for forming the inclined distal end part 122b of the second cavity part 6b has a constant height, it is possible to sufficiently fill the region at the downstream side end of the inclined distal end part 122b.

Figure 5:
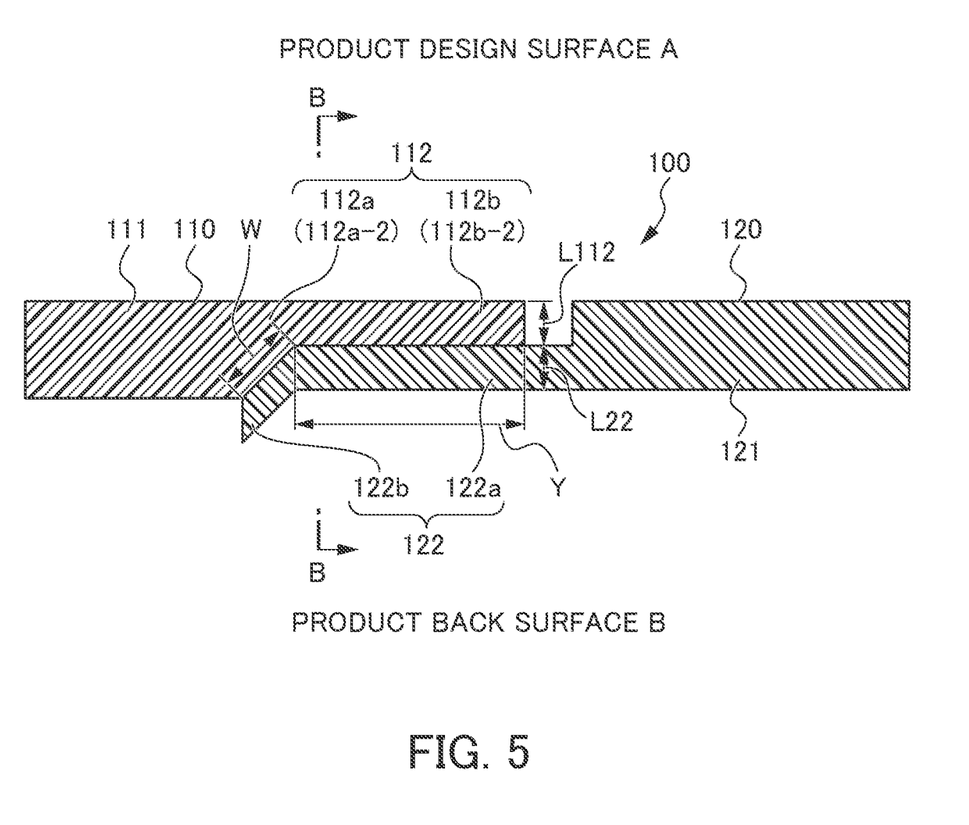
FIG. 5 is a cross-sectional view illustrating a portion of an instrument panel as a molded article according to the embodiment of the present invention, and a portion of the curved part of the first material.

Next, an instrument panel 100 that is a molded article molded by the injection mold 1 will be described. FIG. 4 is a cross-sectional view illustrating a portion of the instrument panel 100 as a molded article according to the embodiment of the present invention, which is a linear part of the first material m1. FIG. 5 is a cross-sectional view illustrating a portion of the instrument panel 100 as a molded article according to the embodiment of the present invention, which is a curved part of the first material m1. The instrument panel 100 is a molded article in which the first material m1 and the second material m2 are integrally molded by injecting the first material m1 and the second material m2 having different compositions into the injection mold 1 and bringing them into contact with each other. The instrument panel 100 includes a first molded part 110 and a second molded part 120.

The first molded part 110 is formed by molding the first material m1 in the first cavity part 6a between the upper mold 2, the first lower mold 3 and the movable core mold 5. The first molded part 110 includes a thick plate part 111 and a joining part 112.

The thick plate part 111 of the first molded part 110 is formed at a constant thickness between the upper mold 2 and the first lower mold 3.

The joining part 112 of the first molded part 110 is formed between the upper mold 2 and the movable core mold 5, and has a plate thickness thinner than that of the thick plate part 111 on the upstream side continuous with the joining part 112 joined to the second material m2 in the first material m1. The joining part 112 of the first molded part 110 has an inclined part 112a and a thinned part 112b.

By inclining the lower surface of the inclined part 112a of the first molded part 110, the inclined part 112a of the first molded part 110 has a plate thickness thinner than that of the thick plate part 111 on the upstream side continuous with the joining part 112 joined to the second material m2 in the first material m1. In the inclined part 112a, the thickness of the joining part 112 joined to the second material m2 in the first material m1 becomes thinner toward the downstream side end. The inclined part 112a gradually changes such that the volume shrinkage difference caused by cooling and solidification of the joining part 112 decreases toward the downstream side end together with the plate thickness changes.

The thinned part 112b of the first molded part 110 has a plate thickness thinner than that of the thick plate part 111 on the upstream side continuous with the joining part 112 joined to the second material m2 in the first material m1. The thinned part 112b is in the form of a thin plate, and the state in which the thickness of the joining part 112 joined to the second material m2 in the first material m1 decreases continues. The thinned part 112b is connected to the downstream side end part of the inclined part 112a. The thinned part 112b has a thickness of about one third of the thick plate part 111.

In the first material m1, the joining part 112 joined to the second material m2 has an inclined part 112a that is inclined so that the thickness of the joining part 112 becomes thinner toward the end edge of the joining part 112, and a thinned part 112b having a predetermined thickness continuous with the inclined part 112a and connected to the inclined part 112a. The sum of the length V (see FIG. 4) of the inclined part 112a in the inclined direction of the inclined part 112a and the length X of the thinned part 112b is at least equal to a prescribed value. Similarly, as illustrated in FIG. 5, the sum of the length W of the inclined part 112a and the length Y of the thinned part 112b in the inclined direction of the inclined part 112a is at least equal to a prescribed value. As a result, the first material m1 and the second material m2 have joint surfaces at least equal to a prescribed value.

As illustrated in FIG. 4, the length of the thinned part 112b in the width direction (the left-right direction in FIG. 4) of the linear part constituting the portion of the edge part of the joining part 112 having a linear shape has a length of the first length X. As illustrated in FIG. 5, the length of the thinned part 112b in the width direction (the left-right direction in FIG. 5) of the curved part constituting the portion of the edge part of the curved joining part 112 has a second length Y longer than the first length X.

The second molded part 120 is formed by molding the second material m2 in the second cavity part 6b between the upper mold 2, the second lower mold 4 and the movable core mold 5. The second molded part 120 includes a thick plate part 121 and a joining part 122.

The thick plate part 121 of the second molded part 120 is formed at a constant thickness between the upper mold 2 and the second lower mold 4. The thick plate part 121 has the same thickness as that of the thick plate part 111 of the first molded part 110.

The joining part 122 of the second molded part 120 is formed between the protruding part 22 of the lower surface 21 of the upper mold 2, the joining part 112 of the first material m1 continuous with the protruding part 22, and the movable core mold 5, and has a plate thickness thinner than that of the thick plate part 121 on the upstream side continuous with the joining part 122 joined to the first material m1 in the second material m2. The joining part 122 of the second molded part 120 has a thinned part 122a and an inclined distal end part 122b.

The thinned part 122a of the second molded part 120 has a plate thickness thinner than that of the thick plate part 121 on the upstream side continuous with the joining part 122 joined to the first material m1 in the second material m2. In the thinned part 122a, a state in which the thickness of the joining part 122 joined to the first material m1 in the second material m2 is constant continues.

The inclined distal end part 122b of the second molded part 120 has a plate thickness thinner than that of the thick plate part 121 on the upstream side continuous with the joining part 122 joined to the first material m1 in the second material m2. The inclined distal end part 122b is a distal end in which the joining part 122 joined to the first material m1 in the second material m2 is inclined downward. The inclined distal end part 122b has a constant thickness and can be sufficiently filled in the downstream side end of the inclined distal end part 122b.

Figure 6:
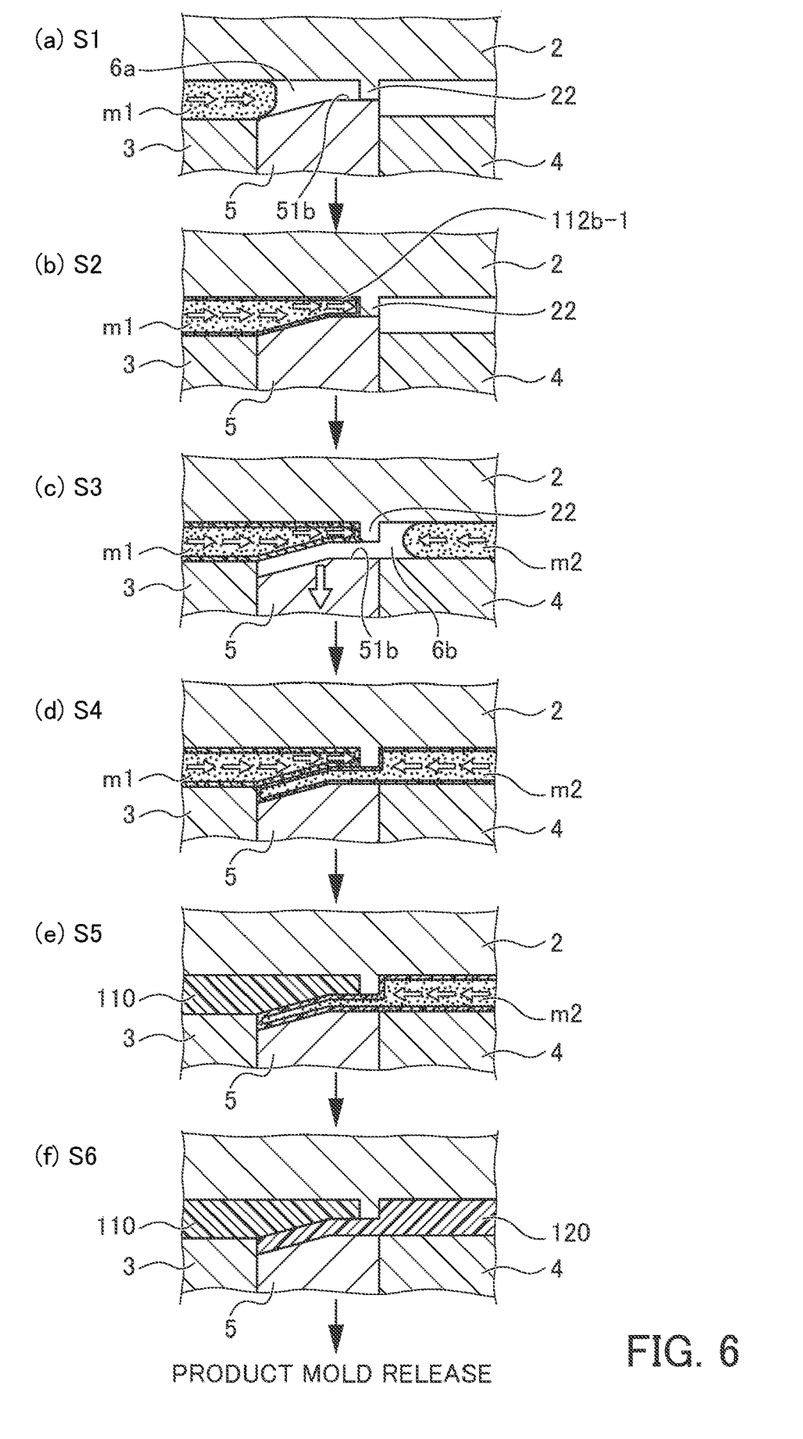
FIG. 6 is a diagram illustrating the molding of the portion of the instrument panel including a portion of the linear part of the joining part in a process group of the injection molding according to the above embodiment, in which (a) illustrates a first material filling process, (b) illustrates a first material pressure holding process, (c) illustrates the first material pressure holding process and a second material filling process, (d) illustrates the first material pressure holding process and a second material pressure holding process, (e) illustrates a first material cooling process and the second material pressure holding process, and (f) illustrates the first material cooling process and a second material cooling process.
Figure 7:
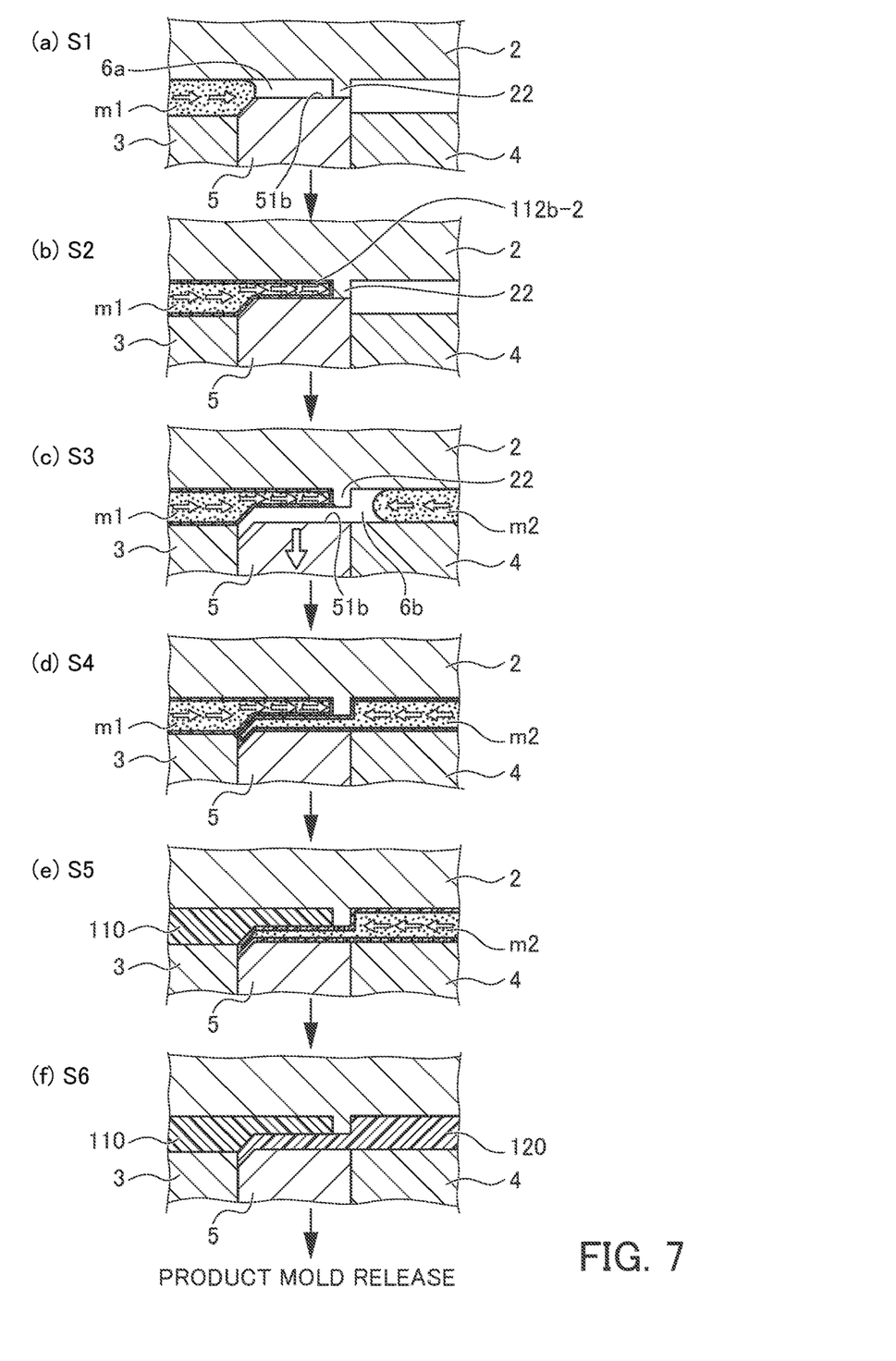
FIG. 7 is a diagram illustrating the molding of the portion of the instrument panel including the portion of the curved part of the joining part in the process group of the injection molding according to the above embodiment, in which (a) illustrates a first material filling process, (b) illustrates a first material pressure holding process, (c) illustrates the first material pressure holding process and a second material filling process, (d) illustrates the first material pressure holding process and a second material pressure holding process, (e) illustrates a first material cooling process and a second material pressure holding process, and (f) illustrates the first material cooling process and the second material cooling process.

Next, an injection molding method for molding the instrument panel 100 as a molded article by the above injection mold 1 will be described. FIG. 6 is a diagram illustrating the molding of the portion of the instrument panel 100 including a portion of the linear part of the joining part 112 in a process group of the injection molding according to the above embodiment, in which (a) illustrates a first material filling process, (b) illustrates a first material pressure holding process, (c) illustrates the first material pressure holding process and a second material filling process, (d) illustrates the first material pressure holding process and a second material pressure holding process, (e) illustrates a first material cooling process and the second material pressure holding process, and (f) illustrates the first material cooling process and a second material cooling process. FIG. 7 is a diagram illustrating the molding of the portion of the instrument panel 100 including the portion of the curved part of the joining part 112 in the process group of the injection molding according to the above embodiment, in which (a) illustrates a first material filling process, (b) illustrates a first material pressure holding process, (c) illustrates the first material pressure holding process and a second material filling process, (d) illustrates the first material pressure holding process and a second material pressure holding process, (e) illustrates a first material cooling process and a second material pressure holding process, and (f) illustrates the first material cooling process and a second material cooling process.

The injection molding method includes a first material molding process and a second material molding process. The first material molding process has a first material filling process S1 and a first material pressure holding process S2. The second material molding process has a first material pressure holding process and a second material filling process S3, a first material pressure holding process and a second material pressure holding process S4, a first material cooling process and a second material pressure holding process S5, and a first material cooling process and a second material cooling process S6.

(First Material Filling Process S1)

As illustrated in (a) of FIGS. 6 and 7, in the first material filling process S1, first, the injection mold 1 moves the movable core mold 5 forward (core forward). The movable core mold 5 stops by bringing the flat surface 51b of the upper surface 51 into contact with the protruding part 22 of the lower surface 21 of the upper mold 2. Therefore, the first cavity part 6a is formed between the upper mold 2, the first lower mold 3 and the movable core mold 5. Further, cooling water circulates in all the upper mold 2, the first lower mold 3, and the movable core mold 5 until the process reaches the first material cooling process and the second material cooling process S6. Thereafter, the injection mold 1 injects the first material m1 from the left side in the drawing to the first cavity part 6a.

(First Material Pressure Holding Process S2)

As illustrated in (b) of FIGS. 6 and 7, in the first material pressure holding process S2, after completion of the first material filling process S1, a pressure holding state is maintained in the state of filling the first material m1 into the first cavity part 6a. Since the cooling water circulates in all the upper mold 2, the first lower mold 3, and the movable core mold 5, particularly in the case of using a member having high thermal conductivity such as BeCu in the movable core mold 5, by circulation of the cooling water inside, the joining part 112 of the first molded part 110 of the instrument panel 100 can transfer heat to the upper surface 51 of the movable core mold 5, and the joining part 112 is cooled and solidified at an early stage. As a result, cooling of the joining part 112, which is a joining part of the first material m1 with the second material m2, can be advanced as compared with the thick plate part 111 on the upstream side continuous with the joining part 112.

At this time, in the first material m1, the sum of the length V of the inclined part 112a and the length X of the thinned part 112b in the width direction of the linear part (the left-right direction in FIG. 4), and the sum of the length W of the inclined part 112a and the length Y of the thinned part 112b in the same direction is formed to be at least equal to a prescribed value. Further, when the length of the thinned part 112b in the width direction (the left-right direction in FIG. 4) of the linear part that is the portion of the edge part of the joining part 112 having a linear shape is defined as a first length X, the length of the thinned part 112b in the width direction (the left-right direction in FIG. 5) of the curved part, which is the portion of the edge part of the joining part 112 having a curved shape, is molded to be a second length Y longer than the first length X.

In this way, as illustrated in FIG. 7, a thinned part 112b-2 of the curved part of the joining part 112 has the length in the width direction (the left-right direction in FIGS. 6 and 7) of the linear part and the curved part longer than the thinned part 112b-1 of the linear part of the joining part 112 illustrated in FIG. 6. Thus, the cooling is accelerated and the cooling solidification is promoted as compared with the thinned part 112b-1 of the linear part of the joining part 112. Further, the joining part 112 of the first molded part 110 undergoes primary shrinkage.

(First Material Pressure Holding Process and Second Material Filling Process S3)

As illustrated in (c) of FIGS. 6 and 7, in the first material pressure holding process and the second material filling process S3, as the surface parts of the joining part 112 and the thick plate part 111 are cooled and solidified, even in the molten state of the inner layer of the joining part 112, the injection mold 1 causes the movable core mold 5 to retreat (core back) downward. As a result, the second cavity part 6b is formed between the upper mold 2, the second lower mold 4 and the movable core mold 5. In the second cavity part 6b, the joining part 112 of the first material m1 is exposed. Thereafter, the injection mold 1 emits the second material m2 from the right side in the drawing to the second cavity part 6b. At this time, the pressure holding state is maintained in the state of filling the first material m1 into the first cavity part 6a.

(First Material Pressure Holding Process and Second material Pressure Holding Process S4)

As illustrated in (d) of FIGS. 6 and 7, in the first material pressure holding process and the second material pressure holding process S4, after completion of the second material filling process S3, the pressure holding state is maintained in the state of filling the second material m2 into the second cavity part 6b. At this time, similarly, the pressure holding state is maintained in the state of filling the first material m1 into the first cavity part 6a. The joining part 112 of the first material m1 melts again when it comes into contact with the second material m2, and then is cooled and solidified.

(First Material Cooling Process and Second material Pressure Holding Process S5)

As illustrated in (e) of FIGS. 6 and 7, in the first material cooling process and the second material pressure holding process S5, since the cooling water circulates inside all the upper mold 2, the first lower mold 3, and the movable core mold 5, cooling of the first material m1 formed in the first molded part 110 in the first cavity part 6a is executed. At this time, the pressure holding state is maintained in the state of filling the second material m2 into the second cavity part 6b. Again, in the movable core mold 5, if a member having high thermal conductivity such as BeCu is used, since the cooling water circulates inside, the joining part 122 of the second molded part 120 of the instrument panel 100 can transfer heat to the upper surface 51 of the movable core mold 5, and the joining part 122 is cooled and solidified early.

(First Material Cooling Process and Second Material Cooling Process S6)

As illustrated in (f) of FIGS. 6 and 7, in the first material cooling process and the second material cooling process S6, since the cooling water circulates inside all the upper mold 2, the first lower mold 3 and the movable core mold 5, the cooling of the first material m1 formed in the first molded part 110 in the first cavity part 6a is executed. Further, when the cooling water circulates inside all the upper mold 2, the second lower mold 4 and the movable core mold 5 at a predetermined interval from the state of (e) of FIGS. 6 and 7, cooling of the second material m2 formed in the second molded part 120 in the second cavity part 6b is executed.

Further, when the cooling of the first molded part 110 molded in the first cavity part 6a is completed for a predetermined time, molding of the first molded part 110 made up of the first material m1 is completed, and cooling for the second molded part 120 to be molded in the second cavity part 6b is waited for a predetermined time. Thereafter, when the molding of the second molded part 120 made up of the second material m2 is completed, by injecting the first material m1 and the second material m2 having different compositions into the injection mold 1 and bringing them into contact with each other, molding of the instrument panel 100 in which the first material m1 and the second material m2 are integrally formed is completed.

According to the present embodiment, the following effects are obtained.

(1) In the present embodiment, according to the injection mold 1 provided with the movable core mold 5 as a partition member that forms a first cavity part 6a for molding the first material m1 and forms a second cavity part 6b for molding the second material m2 by moving after formation of the first material m1, a portion of the first cavity part 6a that is formed by the movable core mold 5 and molds the joining part 112 of the first material m1 joined to the second material m2 includes an inclined surface 51a as an inclined-part forming part that molds an inclined part 112a that is inclined so that the thickness of the joining part 112 becomes thinner toward the end edge of the first material m1 in the joining part 112, and a flat surface 51b as a thinned-part forming part that is continuously connected to the inclined surface 51a and forms the thinned part 112b of a predetermined thickness in a part of the joining part 112. The joining part 112 has a linear part having a linear shape, and a curved part having a curved shape. The sum of the length v of the inclined surface 51a as the inclined-part forming part and the length x of the flat surface 51b as the thinned-part forming part in the width direction of the linear part and in the width direction of the curved part, and the sum of the length w of the inclined surface 51a as the inclined-part forming part and the length y of the flat surface 51b as the thinned-part forming part are at least equal to a prescribed value. The thickness Lll of the portion of the first cavity part 6a on the flat surface 51b as the thinned-part forming part that molds the linear part is substantially the same as the thickness L12 of the portion of the first cavity part 6a on the flat surface 51b for molding the thinned part 112b-2 of the curved part. The flat surface 51b for molding the thinned part 112b-1 of the linear part has a first length x in the width direction of the linear part, and the flat surface 51b for molding the thinned part 112b-2 of the curved part has a second length y longer than the first length x in the width direction of the curved part.

(2) Further, in the present embodiment, according to the injection molding method of integrally molding the first material m1 and the second material m2, by injecting the first material m1 and the second material m2 having different compositions into the mold and bringing them into contact with each other, the method includes: a first material molding process of molding an inclined part 112a that is inclined so that a plate thickness of the joining part 112 becomes thinner toward the end edge of the first material m1 in the joining part 112, in the portion of the first cavity part 6a that molds the joining part 112 of the first material m1 joined to the second material m2, and a thinned part 112b that is continuously connected to the inclined part 112a and has a predetermined thickness; and a second material joining process of molding the second material m2 and joining the second material m2 to the joining part of the first material m1, in the second cavity part 6b for molding the second material m2 joined to the first material m1. In the first material molding process, the first material m1 is molded so that the joining part 112 has a linear part having a linear shape and a curved part having a curved shape. The sum of the length V of the inclined part 112a and the length X of the thinned part 112b, and the sum of the length W of the inclined part 112a and the length Y of the thinned part 112b X in the width direction of the linear part and in the width direction of the curved part is set at least equal to a prescribed value. The thickness L111 of the thinned part 112b of the linear part and the thickness L112 of the thinned part 112b of the curved part are substantially the same. When the length of the thinned part 112b of the linear part in the width direction of the linear part is set as a first length X, the first material m1 is molded so that the length of the thinned part 112b of the curved part in the width direction of the curved part is set to the second length Y longer than the first length X.

(3) Further, in the present embodiment, according to a molded article in which the first material m1 and the second material m2 having compositions different from each other are injected into the mold and come into contact with each other to integrally mold the first material m1 and the second material m2, the joining part 112 of the first material m1 joined to the second material m2 has an inclined part 112a that is inclined so that the plate thickness of the joining part 112 becomes thinner toward the end edge of the first material m1 at the joining part 112, and a thinned part 112b that is continuously connected to the inclined part 112a and has a predetermined thickness. The joining part 112 has a linear part AL having a linear shape, and a curved part AC having a curved shape. The sum of the length V of the inclined part 112a and the length X of the thinned part 112b and the sum of the length W of the inclined part 112a and the length Y of the thinned part 112b in the width direction of the linear part AL and in the width direction of the curved part AC are at least equal to a prescribed value. The thickness L111 of the thinned part 112b-1 of the linear part AL is substantially the same as the thickness L112 of the thinned part 112b-2 of the curved part AC, and when the length of the thinned part 112b-1 of the linear part AL in the width direction of the linear part AL is set as a first length X, the thinned part 112b-2 of the curved part AC in the width direction of the curved part AC has a second length Y longer than the first length X.

As a result, the thickness L112 of the thinned part 112b-2 in the curved part can be set to be thinner than the thickness L101 of the inclined part 112a in the linear part. When the thinned part 112b-2 of the curved part of the joining part 112 is cooled, since the thinned part 112b is thin and wide at the joining part 112 of the curved part, it is possible to inhibit the mold contact area per volume at the joining part 112 of the curved part from becoming smaller than the mold contact area per volume at the joining part 112 of the linear part. As a result, it is possible to accelerate the cooling in the thinned part 112b-2 in the curved part, suppress the volume shrinkage to a small amount, and suppress occurrence of so-called sink marks. As a result, it is possible to avoid appearance defects due to the entry of the second material m2 into the portion in which the sink marks occurred. As a result, it is possible to inhibit the boundary line between the first material m1 and the second material m2 from being formed at an unintended position in the curved part that is curved so as to be sharply bent like a round chamfered shape, in the instrument panel 100 as a molded article.

Incidentally, it is to be noted that the present invention is not limited to the above-described embodiment, and variations, improvements, and the like within the scope capable of achieving the object of the present invention are included in the present invention.

EXPLANATION OF REFERENCE NUMERALS

1 INJECTION MOLD
MOVABLE CORE MOLD (PARTITION MEMBER)
6*a* FIRST CAVITY PART
6*b* SECOND CAVITY PART
51*a* INCLINED SURFACE (INCLINED-PART FORMING PART)
51*b* FLAT SURFACE (THINNED-PART FORMING PART)
100 INSTRUMENT PANEL (MOLDED ARTICLE)
112 JOINING PART
112*a*, 112*a*-1, 112*a*-2 INCLINED PART (FIRST MATERIAL INCLINED PART)
112*b*, 112*b*-1, 112*b*-2 THINNED PART (FIRST MATERIAL THINNED PART)
L11, L12, L22, L111, L112 THICKNESS
x, X FIRST LENGTH
y, Y SECOND LENGTH
m1 FIRST MATERIAL
m2 SECOND MATERIAL

The invention claimed is:

1. An injection mold provided with a partition member that forms a first cavity part configured to mold a first material and forms a second cavity part configured to mold a second material by moving after molding of the first material,
   wherein a portion of the first cavity part that is formed by the partition member and molds a joining part of the first material joined to the second material includes an inclined part forming part that molds a first material inclined part inclined so that a thickness of the joining part becomes thinner toward an end edge of the first material in the joining part, and a thinned-part forming part that is continuously connected to the inclined-part forming part and forms a first material thinned part of a predetermined thickness in a part of the joining part,
   the joining part has a linear part having a linear shape, and a curved part having a curved shape,
   a sum of a length of the inclined-part forming part and a length of the thinned-part forming part in a width direction of the linear part is at least equal to a predetermined value, and a sum of a length of the inclined-part forming part and a length of the thinned-part forming part in a width direction of the curved part is at least equal to the predetermined value,
   a thickness of the thinned-part forming part that molds the linear part is substantially the same as a thickness of the thinned-part forming part that molds the curved part, and
   the length of the thinned-part forming part in the width direction of the linear part is less than than the length of the thinned-part forming part in the width direction of the curved part.

* * * * *